United States Patent [19]
Goldsmith

[11] 3,758,697
[45] Sept. 11, 1973

[54] KEYBOARD REACH EXTENDERS

[76] Inventor: David S. Goldsmith, 8359 Crandon Ave., Chicago, Ill. 60617

[22] Filed: Jan. 19, 1972

[21] Appl. No.: 218,860

[52] U.S. Cl. .................................. 84/425, 84/231
[51] Int. Cl. .............................................. G10c 3/12
[58] Field of Search ............. 84/425, 426, 230–232, 84/423, 430–436, 439, 441, 446, 447, 467

[56] References Cited
UNITED STATES PATENTS

| | | | |
|---|---|---|---|
| 722,998 | 3/1903 | Mahr | 84/425 |
| 155,823 | 10/1874 | Blake | 84/231 |
| 60,744 | 1/1867 | Kirkham | 84/447 |
| 85,965 | 1/1869 | Roz | 84/425 |
| 1,092,291 | 4/1914 | Robinson | 84/425 |
| 1,699,465 | 1/1929 | Edward | 84/423 X |

*Primary Examiner*—Richard B. Wilkinson
*Assistant Examiner*—John F. Gonzales

[57] ABSTRACT

An attachment for an actual piano, for example, comprising a smaller size keyboard than that of the full-size instrument with a linkage for coupling the attached keyboard in such a way that its keys actuate those of the actual full-size keyboard. The reduced size of the keyboard permits a child to play the instrument without hindrance due to the smaller size of his hands. A second linkage is provided for the attachment keyboard for altering the lateral spaces between the keys whereby the reach of the attachment keys may be varied to accommodate the reach of a user of the attachment.

3 Claims, 6 Drawing Figures

Patented Sept. 11, 1973  3,758,697
2 Sheets-Sheet 1
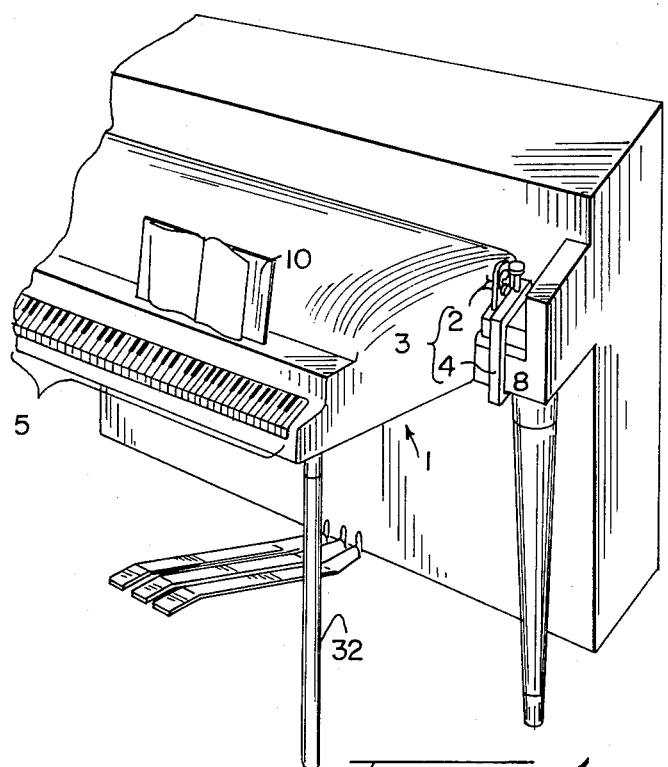
Fig. 1.
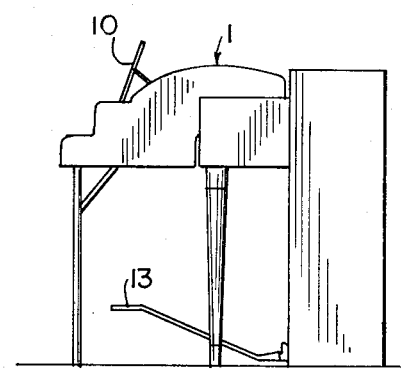
Fig. 2.
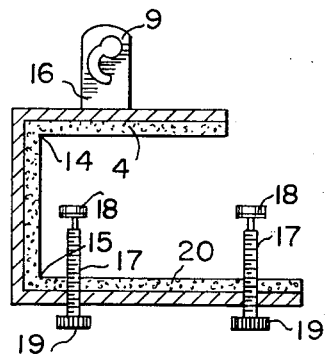
Fig. 4.
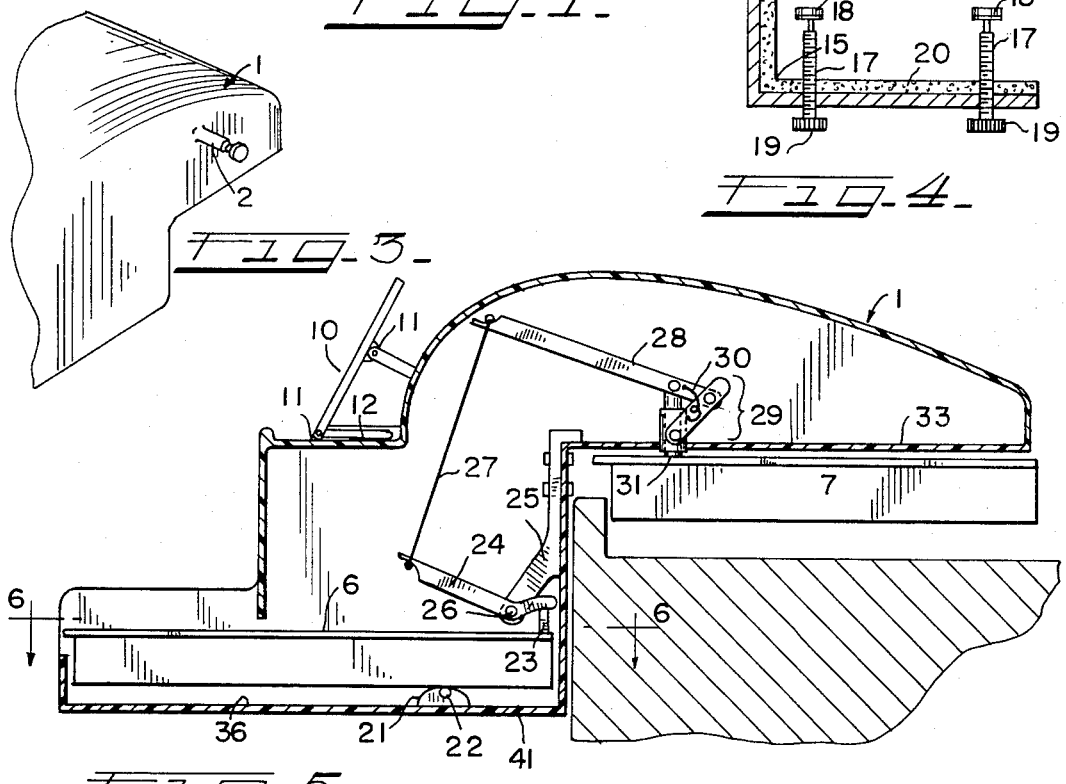
Fig. 3.
Fig. 5.

KEYBOARD REACH EXTENDERS

BACKGROUND OF THE INVENTION

The present invention relates to devices that permit a child to play a keyboard musical instrument without hindrance due to the smaller size of his hands. More specifically, the invention relates to an attachment for an actual piano, for example, comprising a smaller size keyboard than that of the full-size instrument with means for coupling this attached keyboard in such a way that its keys actuate those of the actual full-size keyboard, at the same time providing a realistic piano key action.

An object of the present invention is the provision of an attachable second musical instrument keyboard to an actual full-size musical instrument keyboard that is readily and economically fabricated and assembled on a mass production basis and is adequately rugged for long service life of severe usage.

Another object of the invention is to provide an attachable child's keyboard that is readily set in place or removed from the full-size instrument, so that a child and adult respectively can enjoy the full use of an actual musical instrument.

A further object of the present invention is to eliminate the inaccessibility of a given selection to a child based solely on the inadequate size of his hands, and thereby permit him an acquaintance with masterworks at an earlier time of life.

Another object of the invention is to permit a child to develop an instrumental playing technique and tonal conception based upon the actual instrument rather than a toy-like substitute at an earlier time of life.

Yet another object of the invention is to eliminate the inaccessibility of a given selection to a child based solely upon the deficiencies in tonal character or action of a toy-like substitute for an actual instrument.

Another object of the present invention is to provide a preferred structural embodiment of the device which is readily constructed and permits efficient use and operation thereof.

A more specific object of the invention is to provide a system of levers and cords housed in unitary or modular fashion the object of which is to couple a child's keyboard to an actual keyboard in a direct key to key relationship so that tonal character and action of the original instrument are preserved.

Other objects and advantages of the invention will in part appear hereinafter.

The invention accordingly comprises the features of construction, combination of elements, and arrangement of parts, that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a perspective view of the preferred embodiment of the invention intended for use on a pianoforte.

FIG. 2 is a sideview of the invention intended for use on a pianoforte.

FIG. 3 is a blowup view of the right-hand end of the invention.

FIG. 4 is a sideview of the clamp for securing the invention to the instrument, the other portion thereof being seen in FIG. 3.

FIG. 5 is a midline cross section of the invention positioned in place on a pianoforte.

DESCRIPTION OF THE PREFERRED EMBODIMENTS OF THE INVENTION

Figure 6:
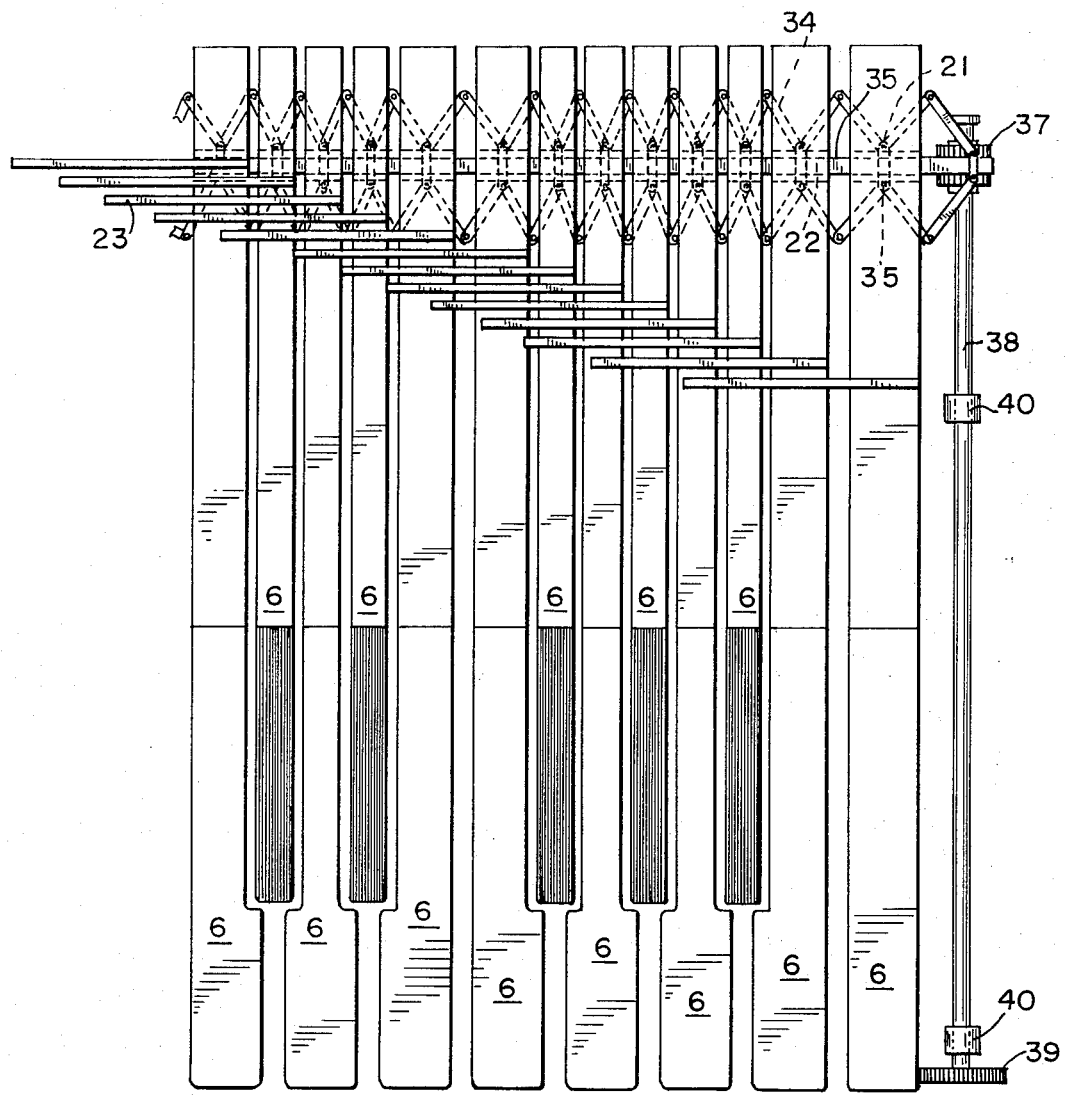
FIG. 6 is taken along plane indicated in FIG. 5.

Referring to FIGS. 1 and 2, the entire device is housed within an envelope or cabinet 1 made of wood or any rugged and suitable plastic. If of plastic, internal fittings and male portions 2 of the securing braces 4, may be anchored in place by embedding resulting from including such fittings in the mold.

As best seen in FIG. 1, the invention here being applied to a piano, a complete keyboard replica of the instrument's actual keyboard is situated for proximity to the player. This keyboard 5 differs from the actual keyboard 7 only in the width of its individual keys 6. From this smaller keyboard 5, the cabinet 1 flares upwards and outwards to completely envelop the actual keyboard 7. The invention remains positioned thus by abuttment along the front guard 8 of the actual keyboard 7 by reason of the right angle configuration of its underside for the purpose of so conforming to the forward shape of the actual instrument. Further to this end is at either end a securing clamped brace 3 consisting of a male portion 2 secured to or embedded in the cabinet 1 at either end thereof and a receiving groove 9 in the separate brace portion thereof 4, for clamping to the actual instrument at the end portions of its keyboard at its outermost portions where there are no keys. The clamped brace portion may be set in position permanently and the invention proper set in place by engagement therein at such time as a child wishes to play the actual instrument. This clamped brace in its separate portions is itself unremarkable, the male and female portions thereof being similar to those seen in steel bed frames. Collapsible legs 32 provide added support.

The cabinet has a music rack or stand 10 as does the actual instrument for supporting sheet music and may furthermore present an electrical lamp for illuminating the same. This rack has hinge 11 and sliding groove 12 supports for positional adjustment which in themselves are unremarkable. In FIG. 2, pedal extenders 13 are seen which comprise little more than sleeves fitting over the pedals of the actual instrument. Their purpose is simply to place the pedals within easy reach of the child. Note also that the entire invension is so designed as to reduce, rather than increase, the height of the child's keyboard 5.

FIG. 4 shows the clamped brace portion of the securement for the invention. It consists of two 90° angles 14 and 15, for receiving the forward portion of the actual instrument, an upward directed arm 16, containing the sliding groove 9 for engagement of the male portion thereof. This clamped brace would be of modified configuration for affixment to another kind of keyboard instrument in such respective ways as may be viewed as self evident. The clamped brace 4 includes the two clamps 17 with turn handles 19 coursing through the brace 4 by means of a thread. Upwards these clamps terminate in pads 18 secured to the clamps 17 by means of ball and socket joints. The entire inner surface of the clamped brace 4 is covered with padding 20 for protecting the finish of the actual instrument.

Reference is now had to FIG. 5 which is a midline cross section of the invention. When the child depresses a key of his keyboard 6, the key rotates over the fulcrum 21 to which the key 6 is attached by a bearing 22. This bearing 22 is an axle attached to the underside of the key 6 at its center. FIG. 5 thus shows the end of this axle. At the end of the key 6 distal to the player and on the upper surface of the key 6 is a flangelike stud 23. Since the fulcrum 21 is placed along the key at a point more proximal to the player than the flangelike stud 23, depressing the key elevates the stud 23. This stud 23 spans the width of the key 6 along its upper side. Elevation of the stud 23 applies an upwardly driving force against the portion of the lever 24 distal to the player. This lever is of a single piece and is rotated about a bearing 26 supported by the arm 25 of which FIG. 5 shows the right-hand side. Elevation of the portion of lever 24 distal to the player thus has the effect of imparting tension to the steel wire 27 as it attaches to the portion of lever 27 proximal to the player. Cord or wire 27 attaches at its opposite end to lever 28 representing that portion of the linkage system 29. Linkage system 29 is of a common kind seen in automobile grease guns and hand water pumps which in the present embodiment appears in miniature. All joints in the present invention pose minimal friction for efficient as possible force transference, this best realized through the encorporation of low friction plastic material in the joints. Depression of lever 28 imparts to the linkage system 29 a force it translates into downward motion of the pin 31. Pin 31 acts upon the key of the actual instrument 7 to actuate it. Linkage system 29 may be substituted with one of a different type such as a cam mounting a lever, for example. All levers pairs, a pair consisting of the actuating lever of the child's keyboard 5 and the actuated lever of the actual instrument 28 are so positioned as to retain the proper swing or distance in downward displacement for the child's key, this distance being the same as that of the actual keys of the instrument. Spring 30 reverses this motional chain bringing the child's key back to its nondepressed starting position.

Referring to FIG. 5, it may be seen that levers 24 and 28 may be angled away from the plane of the drawing. While those keys of the child's keyboard 5 central to it may be coupled to those keys of the actual keyboard 7 corresponding to them in a facing relationship between levers 24 and 28 without adjustment, due to its smaller size, as one moves away from the center of the child's keyboard 5, the positional relationship between corresponding keys of the two keyboards becomes more angular due to the smaller width of the child's keys. Because of the rotatability of levers 24 and 28 this does not result in a lost motional and attendant force component. The support arms 25 are angled to uphold this facing relationship between levers 24 and 28. The underside of the invention seen in FIG. 5 at 33 is contoured for accepting the black keys.

Referring now to FIG. 6, description will be made of an optional or accessory feature of the invention. The purpose of this feature is to provide shifting the keys for respacing them from one another in order to allow use of the invention by several children of varying but less than adult hand size. Such a feature lends itself of usefulness to piano teachers. Another application for the feature is to allow for growth in an individual child.

FIG. 6 shows the upper side of the plane of the invention at the key portion 33 on the right-hand end as indicated in FIG. 5. It may be noted from the foregoing description that the keys of the child's keyboard 6 are fixedly related only to the fulcrum 21. Consequently, if lateral motion be imparted to fulcrum 21, the key would itself be moved laterally. It may be noted that for the keys to be separated from one another by a consistent interval, their displacement referred to a stationary leftmost joint will be additive or cumulative. That is, if all the keys were to move with the same displacement the result would be to shift them in a unitary fashion or without change in their relative placement as is seen when the soft pedal of a grand piano is depressed. In order to respace the keys by a consistent and greater internal, successive keys must move by an interval representing the product of the interval of increment and the number of previous keys beginning from the stationary end. In order to increase the size of an octave by three quarters of an inch, the keys must be separated by one sixteenth of an inch from one another. Over the entire keyboard, 87 keys must be separated thus, the endmost being stationary. The accumulated displacement is then slightly in excess of 5.4 inches over the entire keyboard. Such an accumulated displacement renders it very difficult to provide clearance for the flangelike studs 25 which must be of equivalent length to remain operatively associated with their respective levers 24 as is essential. In order to lessen this accumulated displacement, a central key, specifically middle F serves as stationary and displacement is towards the left for those keys situated to the left of middle F and towards the right for those keys situated to the right of middle F. In this way, the accumulated displacement is reduced to slightly less than 2¾ of an inch. If it is intended to displace the keys up to three quarters of an inch per octave as is the present case, slightly less than 2¾ of an inch are allowed for the flangelike studs 23 and additionally as a potential space at either end of the keyboard 5 for containment of the spaced apart keys up to their maximum displacement. This space may be taken up by a section extending from the cabinet when withdrawn manually to the correct distance in the manner of a sliding door. In a child's keyboard the keys of which are three quarters the full size width, each key is about two thirds of an inch wide or ten and two thirds sixteenths of an inch. To this we may add (or subtract) one sixteenth of an inch for lateral stretch or shifting. If we add the one sixteenth inch, the child's keys remain scaled at three to four. This allows each child's key eleven and two thirds sixteenths of an inch. As the accumulated displacement to either side is slightly under 2¾ inches, which is slightly more than forty three and one half sixteenths inches, and the flangelike stud 23 is this length at the key at either end (although it will be understood in the opposite direction, its displacement taking place in the opposite direction), the studs 23 being reduced by the accumulative factor of one sixteenth of an inch representing their respective additive displacement moving towards middle F from either end key, cross over 4.09 keys at the end keys, representing the quotient of ten and two thirds sixteenths of an inch for each key and fourty three and fifty two one hundredths sixteenths inches for the end studs. Since the lever 24 and bearing 26 occupy less than the width of the keys allowing 0.09 of an inch to either side of each key, the outermost and longest studs 23 must receive clearance over the next inner four keys when the keyboard is in its undisplaced, stretched, or undistended state. Moving towards the center occupied by middle F this reduces one sixteenth of an inch over each key, so that 11 keys inward from either end, the studs begin to require offsetting clearance from three keys. This offsetting to allow clearance for the studs 23 which must remain in contact with their respective levers 24 in order to retain operatively associated, is accomplished by positioning successive lever 24 and support arm 25 elements in different planes of height and proximity to the player side. Specifically, successive studs pass at the points representing the crooks in levers 24. Needless to say, successive studs 23 are of somewhat greater height and in this embodiment the levers 24 and bearings 26 are designed to provide maximum clearance. FIG. 6 shows placement of the studs 23 as seen from above, it being understood that offset is also provided in the height dimension. Note that black keys are not actually narrower as they appear on the keyboard. Moreover, at their rearward and outwardly unseen portion they must be as sturdy as the white keys, so that at this portion, equal thickness has been allowed for the black keys as the white keys. The black keys are actually the same in width as the narrower and rearward portion of the white keys from which width is taken to provide space for the black keys, as is seen on a standard keyboard when one looks more carefully. Nevertheless, FIG. 6 presents the rearward portion of the black keys as narrower for visual clarity. Note that the studs at the ends cover or pass through four keys when the keyboard is unstretched. When stretched, the overlap is of course, reduced. Needless to say, in an embodiment of the invention permitting stretching between the keys, compensatory repositioning is applied to the various leverage components for maximum uniformity in the actions of the various keys and for the preservation of a facing positioning for levers 24 and 28, so that tangential vector components with attendant less in mechanical efficiency are avoided. Directly beneath the keys are their fulcrums 21 and bearings 22 seen in FIG. 6 as broken lines. A rod 35 passes through the bottoms of the fulcrums 21 in line with the bearing axles above it. In this embodiment, the interfaces between the bottoms of the fulcrums 21 and the floor therebeneath 36 in FIG. 5 encorporates a low friction plastic material as does the interface of the through holes of the fulcrums 21 for passage therethrough of slide rod 35 along which the fulcrums are conducted in displacement laterally by the infant protective gate type linkage 34 consisting of consecutive collapsible complementary angles. The slide rod 35 contains the laterally travelling cross point joints of this linkage to which the fulcrums 21 are stationarily jointed to unswerving and equal expansion in consecutive linkage sections. Such a linkage is an everyday commonplace and requires no further description other than in the present embodiment it is miniature and precision made for retension of straight travelling alignment. A sliding groove in the floor of the cabinet floor 36 passes a downward rod (not shown) that inserts upon a geared rack 37 which thus is fixedly and rotatably associated with the extreme end straight central travelling joint of the collapsible linkage 34. Beneath this rack 37 is a pinion (not shown) engaging the rack 37 on its underside by means of gears. The gear of the rack faces downwardly, of course. The pinion (not shown) attaches to a rod 38 leading to a central rotary handle 39 that is in turn supported by rotary joint braces securing it to the underside of the key portion of the invention designated 41 in FIG. 6. Needless to say, at the points just short of the center of middle F, a second linkage as 34 is controlled by a second pinion placed above rather than beneath the rack 37, the inward fixed points of the linkages being just short of the center and beneath the middle F, there being a single sliding rod 35 coursing through the fulcrums 21 throughout the length of the keyboard 5. Rotation of the rotary handle thus simultaneously displaces keys to the right of middle F to the right while it displaces keys to the left of middle F to the left. To substitute for the rack and pinions a machine tool slide screw with reversed threads at opposite ends is viewed as obvious. For streamlined design, these added parts for the embodiment of the invention able to undergo stretching between the keys is secondarily floored under thereby completely to enclose the invention in a contoured cabinet.

It should be noted that in an ordinary plane, for example, as manufactured, the keys are not physically joined to succeeding elements in the actions. Consequently, the design procedure hereinbefore disclosed for stretching the distance between the keys is applicable to ordinary planes, for example.

In every case, stretching the distance between the keys should be limited to about one sixteenth inch between adjacent keys as this provides three quarters of an inch per octave which is more than adequate in most cases, and because stretching the keys apart to a greater degree than this results in discomfort to the player whose finger tips betimes alight upon spaces between the keys presenting edges. This is, stretching should always be significantly less than the width of the fingers of the individual for which keyboard size is determined initially.

It will thus be seen that the objects set forth above among those made apparent from the preceding description are efficiently attained, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

I claim:

1. An attachment unit for operative association with a musical instrument which includes a plurality of individual instrument keys arranged in keyboard form and having a first, standard size, said attachment unit including, in combination, a housing unit adapted for physical association with said musical instrument, a plurality of individual attachment keys of reduced width relative to said instrument keys and disposed within said housing, said attachment keys being laterally spaced apart in one position of use by a predetermined distance, and mounted so as to permit depression of their forward ends in response to an applied key striking pulse and arranged such that each attachment key occupies a position within the attachment corresponding to its counterpart key in the instrument, and separate means disposed within said housing for transmitting an impulse to a portion of each of said instrument keys in response to an impulse received by said attachment keys, whereby an impulse imparted to a given attachment key will be transmitted to a corresponding instrument key, said attachment unit further including means operative in response to a single means for altering said lateral spaces between keys, whereby the reach of the attachment keys may be varied to accommodate the reach of a user of the attachment unit.

2. An attachment unit as defined in claim 1 wherein each of said attachment keys pivots about a common axis, wherein each of said keys includes a collar unit forming a portion of the pivot point thereof, and wherein a plurality of levers are arranged as a telescoping bellows to provide a portion of said means for altering said lateral spacing between keys.

3. An attachment unit as defined in claim 1 wherein said single means for altering said spaces between keys are operative in response to movement of a single control unit and wherein said control unit is disposed adjacent the keyboard portion of said attachment.

* * * * *